(12) United States Patent
Schlemmer et al.

(10) Patent No.: US 10,436,044 B2
(45) Date of Patent: Oct. 8, 2019

(54) GUIDE VANE SEGMENT FOR A TURBOMACHINE

(71) Applicant: MTU Aero Engines AG, Munich (DE)

(72) Inventors: Markus Schlemmer, Sandelzhausen (DE); Martin Pernleitner, Dachau (DE); Nina Wolfrum, Feldkirchen (DE); Markus Brettschneider, Karlsfeld (DE); Inga Mahle, Munich (DE)

(73) Assignee: MTU Aero Engines AG, Munich (DE)

( * ) Notice: Subject to any disclaimer, the term of this patent is extended or adjusted under 35 U.S.C. 154(b) by 214 days.

(21) Appl. No.: 15/367,657

(22) Filed: Dec. 2, 2016

(65) Prior Publication Data

US 2017/0159465 A1 Jun. 8, 2017

(30) Foreign Application Priority Data

Dec. 4, 2015 (DE) ................. 10 2015 224 283

(51) Int. Cl.
| | | |
|---|---|---|
| *F01D 9/04* | (2006.01) | |
| *F04D 29/54* | (2006.01) | |
| *F01D 5/14* | (2006.01) | |
| *F01D 5/16* | (2006.01) | |

(52) U.S. Cl.
CPC ............ *F01D 9/041* (2013.01); *F01D 5/143* (2013.01); *F01D 5/16* (2013.01); *F04D 29/544* (2013.01); *F05D 2220/323* (2013.01); *F05D 2240/122* (2013.01); *F05D 2260/961* (2013.01); *Y02T 50/673* (2013.01)

(58) Field of Classification Search
CPC . F01D 9/041; F01D 5/143; F01D 5/16; F01D 5/14; F01D 5/141; F01D 25/04; F01D 25/06; F04D 29/544; F04D 29/66; F04D 29/661; F04D 29/666; F04D 29/668; F05D 2220/323; F05D 2240/122; F05D 2260/961; Y02T 50/673
USPC ............................................. 416/175, 223 R
See application file for complete search history.

(56) References Cited

U.S. PATENT DOCUMENTS

| | | | |
|---|---|---|---|
| 5,080,558 A | * | 1/1992 | Tran ................. F01D 5/141 29/889.7 |
| 7,497,664 B2 | | 3/2009 | Walter et al. |
| 9,017,030 B2 | | 4/2015 | Beeck |
| 9,097,125 B2 | | 8/2015 | Ghorbani Zarimahalleh et al. |

(Continued)

FOREIGN PATENT DOCUMENTS

| | | |
|---|---|---|
| DE | 102005006414 A1 | 8/2006 |
| DE | 102013213416 A1 | 1/2015 |

(Continued)

*Primary Examiner* — Woody A Lee, Jr.
*Assistant Examiner* — Sabbir Hasan
(74) *Attorney, Agent, or Firm* — Barlow, Josephs & Holmes, Ltd.

(57) ABSTRACT

The invention relates to a guide vane cluster for a turbomachine, in particular for a turbojet engine, having at least two vanes that are joined together by way of at least one common platform for the radial delimiting of a flow channel of the turbomachine, wherein each vane has a vane element with a suction side and a pressure side that are joined together by a leading edge and a trailing edge, wherein the at least two vanes have different trailing edge wall thicknesses at least in a corresponding radial lengthwise extension region.

12 Claims, 4 Drawing Sheets

(56) References Cited

U.S. PATENT DOCUMENTS

| | | | |
|---|---|---|---|
| 2008/0134504 A1* | 6/2008 | Schoenenborn | F01D 5/005 29/889.1 |
| 2009/0013532 A1 | 1/2009 | Wood et al. | |
| 2010/0247310 A1* | 9/2010 | Kelly | F01D 5/10 416/1 |
| 2014/0072407 A1* | 3/2014 | Harron | F01D 5/16 415/119 |
| 2016/0017796 A1* | 1/2016 | Xu | F01D 5/143 415/208.2 |

FOREIGN PATENT DOCUMENTS

| | | |
|---|---|---|
| EP | 1645720 A1 | 4/2006 |
| WO | 2005116404 A1 | 12/2005 |
| WO | 2013018073 A1 | 2/2013 |
| WO | 2013186756 A1 | 12/2013 |

* cited by examiner

GUIDE VANE SEGMENT FOR A TURBOMACHINE

BACKGROUND OF THE INVENTION

The invention relates to a guide vane cluster for a turbomachine, in particular for a turbojet engine. In addition, the invention relates to a guide vane ring for a turbomachine, as well as a turbomachine, in particular a turbojet engine.

Guide vane clusters for turbomachines are already known from the prior art and comprise two or more vanes that are joined together by way of at least one common platform for the radial delimitation of a flow channel of the turbomachine. In this case, each vane has a vane element with a suction side and a pressure side that are joined together by an upstream leading edge that the operating fluid flows through during operation of the turbomachine and by an axially opposite-lying trailing edge, arranged downstream. Several guide vane clusters are arranged in the form of a guide vane ring in a compressor or a turbine of the turbomachine and fixed in place opposite a housing of the turbomachine. The turbomachine, which may involve, for example, a turbojet engine or an aircraft engine, comprises, in addition, a plurality of rotating blades, which are assigned to at least one rotor and rotate opposite the stationary guide vanes as well as the stationary housing.

Viewed as a disadvantage in the known guide vane clusters is the circumstance that, like all mechanical structures, they vibrate at their natural or characteristic frequencies. During the operation of a turbomachine having such a guide vane cluster, the vanes thereof are thus stimulated in their characteristic form of vibration under specific operating conditions. When this occurs, high mechanical loads on the vanes or the guide vane cluster may arise, since all vanes vibrate at comparable characteristic frequencies and thus in phase. On the one hand, these high loads constrict the operating region and, on the other hand, they can considerably reduce the service life of the guide vane cluster.

BRIEF SUMMARY OF THE INVENTION

The object of the present invention is to create a guide vane cluster of the type named initially, which has an improved vibration behavior. Additional objects of the invention consist in creating a guide vane ring with an improved vibration behavior and providing a turbomachine having such a guide vane cluster or guide vane ring that has an improved vibration behavior.

The objects are achieved according to a guide vane cluster, a guide vane ring, as well as by a turbomachine in accordance with the present invention. Advantageous embodiments with appropriate enhancements of the invention are indicated in the dependent claims, wherein advantageous embodiments of each aspect of the invention are to be viewed as advantageous embodiments of each of the other aspects of the invention, and vice versa.

A first aspect of the invention relates to a guide vane cluster for a turbomachine, in particular for a turbojet engine, wherein an improved vibration behavior is achieved according to the invention, due to the fact that at least two vanes have different trailing edge wall thicknesses, at least in a corresponding radial lengthwise extension region. In other words, at least two different vanes or vane elements are produced in one guide vane cluster, and these vanes or vane elements have different trailing edge thicknesses in comparison to each other at one or more radial positions. In this way, the characteristic frequencies of the at least two vanes will be changed so that they will be detuned in a targeted manner and will no longer vibrate in phase during operation. By way of the individual variation of the trailing edge wall thicknesses for at least two vanes, targeted structural stiffenings are also produced at places where this is necessary. Additionally, a non-symmetric annular space for the working medium of the assigned turbomachine is produced between the asymmetrically designed vanes of the guide vane cluster, whereby the aerodynamics of the guide vane cluster can also be optimized advantageously. In the scope of the present invention, the directional indications "radially" or "radial", "axially" or "axial" and "peripheral" always refer to the machine axis of a turbomachine, when the guide vane cluster according to the invention is mounted in the latter as intended, as long as nothing ensues otherwise from the context, either explicitly or implicitly.

In fact, it is already known, for example, from U.S. Pat. No. 9,097,125 B2, to design adjacent blades of a blade ring differently from one another in order to achieve a detuning of the blade ring and thus to improve the vibration behavior. However, U.S. Pat. No. 9,097,125 B2 does not relate to guide vanes, but rather to rotating blades. Added to this is the fact that U.S. Pat. No. 9,097,125 B2 only teaches to thicken a middle region of individual blades relative to other blades, considered in the axial direction, but not to vary the shape, in particular the thickness, of the leading and trailing edges.

If the trailing edge is designed in a profile cross section as a circular segment, at least essentially, in particular as a half-circle, at least essentially, then the chord length of this circular segment, in particular the diameter of this half-circle, can define the wall thickness of the trailing edge in this profile cross section or in this radial position in the direction of the radial lengthwise extension, in the sense of the present invention. If the trailing edge is designed in a profile cross section as an ellipse segment, at least essentially, in particular as a half-ellipse, at least essentially, then the chord length of this ellipse segment, in particular the primary or secondary axis of this half-ellipse, can define the wall thickness of the trailing edge in this profile cross section or in this radial position in the direction of the radial lengthwise extension, in the sense of the present invention. If the trailing edge is designed as straight in a profile cross section, at least essentially, then the length of this straight trailing edge, can define the wall thickness of the trailing edge in this profile cross section or in this radial position in the direction of the radial lengthwise extension, in the sense of the present invention. In one embodiment, the wall thickness of the vane or of the vane element can be understood as the maximum wall thickness of the vane or of the vane element in a region that extends at most 30%, i.e., at most 30%, 29%, 28%, 27%, 26%, 25%, 24%, 23%, 22%, 21%, 20%, 19%, 8%, 17%, 16%, 15%, 14%, 13%, 12%, 11%, 10%, 9%, 8%, 7%, 6%, 5%, 4%, 3%, 2%, 1% or less, in front of the axially back end of the vane element upstream or axially toward the leading edge. In this case, the vanes of the guide vane cluster can be joined, in particular integrally, with the platform basically in a detachable or permanent manner.

In this case, it has been shown surprisingly that the vibration behavior of the guide vane cluster can already be significantly improved essentially by exclusively making at least two vanes of the guide vane cluster different in that they have different trailing edge wall thicknesses in a corresponding radial lengthwise extension region. In particular, the guide vanes are designed identically, preferably in an axial region of at least 50%, more preferably of at least 75%, starting from the leading edge of the guide vanes. In other words, the variation in the wall thicknesses of the trailing edge is preferably effected only in a back axial region, which makes up at most half, preferably at most a quarter, of the axial extent of the guide vanes between the leading edge and the trailing edge, starting from the trailing edge. Otherwise, the vanes of the guide vane cluster can be essentially designed completely identically. It is thus not necessary to vary the entire shape of individual vanes of the guide vane cluster, for example, by designing several vanes noticeably thicker than other vanes in their axially central region, or by varying the slope of their respective thread axes relative to the radial line. Such measures are relatively complex structurally and also make difficult a calculated prediction of the precise flow behavior of the turbomachine. It is thus to the credit of the inventor to have recognized that a comparatively small modification of the individual vanes of the guide vane cluster in the region of their trailing edge is sufficient in order to achieve noticeable advantages with respect to the vibration resistance of the guide vane cluster. The different trailing edge wall thicknesses of two otherwise essentially identically designed vanes of the guide vane cluster can be achieved, for example, by extending one vane in the radial lengthwise extension region in question somewhat less far in the axial direction of the turbomachine than the other vane. In this way, its trailing edge, with otherwise the same vane shape, can be designed thicker than said other vane of the guide vane cluster. Alternatively, however, the vane can also be simply thickened in the region of its trailing edge relative to another vane of the guide vane cluster, so that both vanes extend equally far in the axial direction of the turbomachine.

Therefore, it is proposed in an enhancement of the present invention that at least two, and preferably all, vanes of the guide vane cluster are designed identically, with the exception of their respective trailing edge regions. In other words, it is provided that two, several, or all vanes, depending on the number of vanes in the guide vane cluster, are designed identically, at least essentially, whereby, however, they have different trailing edge thicknesses for the targeted detuning in a specific radial region in each case.

In an advantageous embodiment of the invention, it is provided that the at least two vanes are joined together by way of a common radially inner platform and a common radially outer platform. In other words, the guide vane cluster has a radially outer platform, which can also be designated a radially outer shroud segment, as well as a radially inner platform, which can also be designated a radially inner shroud segment, and the vanes extend radially between these platforms. Both the vibration properties and the aerodynamic properties of the guide vane cluster can be influenced and improved in a targeted manner thereby. The two common platforms can each be joined detachably or permanently with the vanes, independently of one another. In particular, at least one of the platforms can be designed integrally with the vanes, for example, by their original forming or by additive manufacturing methods. Likewise, it can be provided that at least one of the platforms is cohesively joined with the vanes, in particular, is welded to them.

Additional advantages result if at least two vanes have roundings with different rounding radii in their corresponding regions connecting them to the at least one common platform. In other words, it is provided that at least two, several, or all vanes of the guide vane cluster, in their regions connecting them to at least one common platform that may involve the outer and/or the inner platform, depending on the embodiment, have a connection region that is rounded concavely or convexly, at least in sections, and that can also be designated a flute or a fillet. In this case, the rounding radii of at least two vanes are different, whereby a targeted detuning, a setting of specific mechanical properties, and an influencing of the contour of the annular space between the vanes and thus an influencing of the aerodynamic properties of the guide vane cluster are made possible. In this case, the roundings can basically extend along the entire periphery of each vane or only along a partial region of the periphery. Likewise, it can be provided that the roundings of two vanes are different only in specific regions or along the entire periphery of the vanes in question. Preferably, at least roundings that are arranged in the connection region of the trailing edges of at least two vanes have different rounding radii, whereby different trailing edge wall thicknesses result in radial lengthwise extension regions of the vanes corresponding to one another, and accordingly, differently configured annular spaces also result.

In another advantageous embodiment of the invention, it is provided that the guide vane cluster comprises at least three vanes, wherein at least two, and preferably all, vanes of the guide vane cluster have different trailing edge wall thicknesses in a corresponding radial lengthwise extension region. In other words, it is provided that the guide vane cluster comprises three or more vanes, at least two of which have different trailing edge wall thicknesses. The third vane and optionally any other vanes can be designed identically to the first or second vane or individually different from these, as desired. In general, it can be stated that the vibration behavior of the guide vane cluster can be better modified and set when more vanes have different trailing edge wall thicknesses in radial lengthwise extension regions corresponding to each other.

In another advantageous embodiment of the invention, it is provided that the vanes have at least one end region in the vicinity of the platform that extends away from the platform by at most 25% of the radial lengthwise extension of the trailing edge. The region in the vicinity of the platform that comprises the radially inner and/or the radially outer end region or connection region of the vane can be, for example, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2% or 1% of the radial lengthwise extension of the vane in question. According to an alternative or additional embodiment, the vanes have at least one region remote from the platform that extends in a middle region of the trailing edge by at least 25% of the radial lengthwise extension of the trailing edge. For example, the region far from the platform can amount to 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75% or more of the radial lengthwise extension. The region in the vicinity of the platform and/or the region remote from the platform can have different trailing edge wall thicknesses in the case of at least two guide vanes.

Additional advantages result when at least one of the vanes has a maximum trailing edge wall thickness in a region in the vicinity of the platform and/or in a region remote from the platform. This represents another advantageous possibility for detuning as well as for setting the mechanical properties of the vane in question. The region in the vicinity of the platform and the region remote from the platform differ in the case of at least one vane, preferably with respect to the maximum trailing edge wall thickness of the vane in question.

In another advantageous embodiment of the invention, it is provided that the maximum and/or a minimum trailing edge wall thickness of at least one vane is constant, at least essentially, along a predetermined radial lengthwise extension region. The constant maximum or minimum trailing edge wall thickness can be provided in this case, for example, along a portion of a region in the vicinity of the platform and/or of a region remote from the platform or along the entire region of the vane in the vicinity of the platform or remote from it.

In another advantageous embodiment of the invention, it is provided that at least one vane has a radial transition region between a maximum and a minimum trailing edge wall thickness. Internal tensions and loads of the vane in question can be reduced thereby.

It has been shown to be advantageous if the trailing edge wall thickness in the transition region of the vane increases continually and/or monotonically, in particular strongly monotonically, from the minimum to the maximum trailing edge wall thickness. In this way, a gentler, low-tension, and aerodynamically favorable transition can be presented between the region of minimum trailing edge wall thickness and the region of maximum trailing edge wall thickness. Alternatively or additionally, it is provided that the transition region extends over at most 25% of the radial lengthwise extension of the trailing edge and thus, for example, amounts to 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2% or 1% of the radial lengthwise extension of the vane in question.

In another advantageous embodiment of the invention, it is provided that at least two vanes have the same axial length and/or the same chord length, and/or that at least one vane, in comparison to at least one other vane, has a cut-back profile in the region of its trailing edge. This permits a high structural freedom for the embodiment of the guide vane cluster. Because at least one of the vanes, in comparison to another vane, is cut back in the region of its trailing edge, different trailing edge thicknesses can be realized in a particularly simple way, since vanes that are at first identically designed can be manufactured or used, and then can be adapted optimally to the respective application objective by targeted cutting back in the region of the trailing edge. Alternatively, of course, it can also be provided that the shortened vane is not cut back, but rather that it is designed beforehand to be shorter than one of the other vanes.

A second aspect of the invention relates to a guide vane ring for a turbomachine, this ring comprising at least one guide vane cluster according to the first aspect of the invention. Because the guide vane ring comprises one or a plurality of guide vane clusters according to the first aspect of the invention, or is composed of the latter, it has an improved vibration behavior, since at least two, and preferably all, vanes of the guide vane ring have vane elements with different trailing edge wall thicknesses or trailing edge thicknesses at different radial positions. Non-symmetrical annular space contours are also formed thereby, whereby the aerodynamic properties of the guide vane ring are improved. Likewise, structural conditions with respect to distribution of mass or stiffening can be optimally adapted in accordance with the respective requirements. Additional features and their advantages result from the description of the first aspect of the invention, wherein advantageous embodiments of the first aspect of the invention are to be viewed as advantageous embodiments of the second aspect of the invention, and vice versa.

A third aspect of the invention relates to a turbomachine, in particular a turbojet engine, comprising at least one guide vane cluster according to the first aspect of the invention and/or at least one guide vane ring according to the second aspect of the invention. The turbomachine has an improved vibration behavior thereby, since at least two, and preferably all, vanes of the guide vane cluster or guide vane ring have vane elements with different trailing edge wall thicknesses or trailing edge thicknesses at different radial positions. Therefore, non-symmetrical annular space contours are also formed, whereby the aerodynamic properties of the guide vane cluster or guide vane ring are improved. Likewise, structural conditions with respect to distribution of mass or stiffening can be optimally adapted in accordance with the respective requirements. Additional features and their advantages result from the description of the first and the second aspects of the invention, wherein advantageous embodiments of the first and second aspects of the invention are to be viewed as advantageous embodiments of the third aspect of the invention, and vice versa.

BRIEF DESCRIPTION OF THE DRAWINGS

Further features of the invention result from the claims and the examples of embodiment. The features and combinations of features named above in the description, as well as the features and combinations of features named in the examples of embodiment below and/or shown alone can be used not only in the combination indicated in each case, but also in other combinations or uniquely, without departing from the scope of the invention. Thus, embodiments of the invention that are not explicitly shown and explained in the embodiment examples, but become apparent from the embodiments explained and that can be produced by separate combination of features, are also to be viewed as comprised and disclosed. Embodiments and combination of features that thus do not have all features of an originally formulated independent claim are also to be viewed as disclosed. Herein:

DETAILED DESCRIPTION OF THE INVENTION

Figure 1:
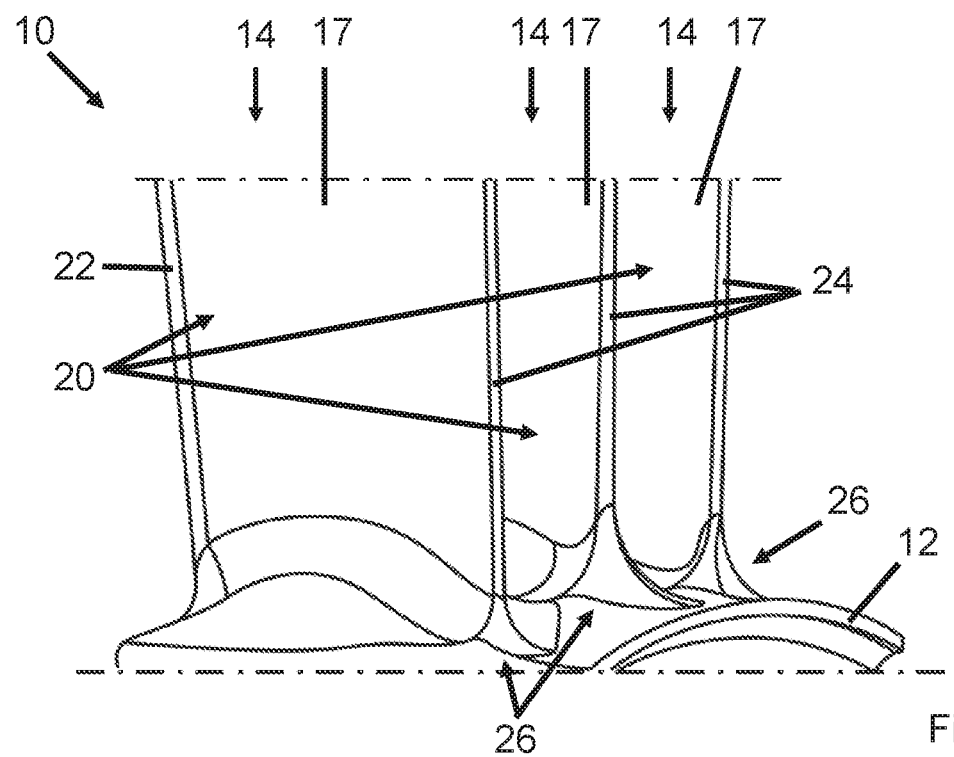
FIG. 1 shows a schematic perspective view of a guide vane cluster according to the invention in the region of a radially inner platform.
Figure 2:
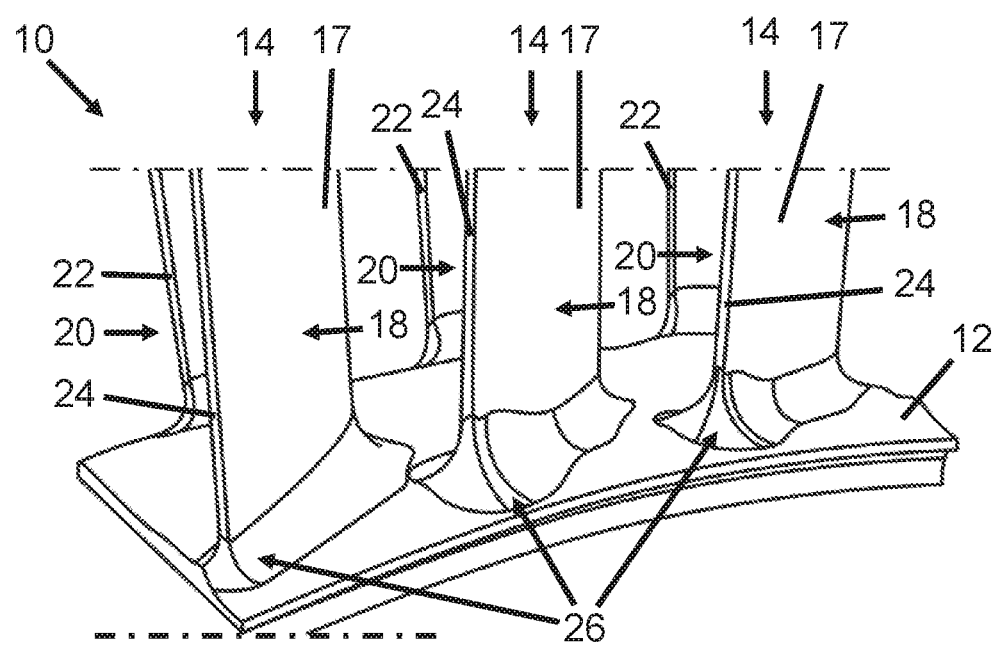
FIG. 2 shows another schematic perspective view of the guide vane cluster according to the invention in the region of the radially inner platform.

FIG. 1 shows a schematic perspective view of a guide vane cluster 10 according to the invention in the region of a radially inner platform 12. FIG. 1 will be explained in the following together with FIG. 2, in which another schematic perspective view of the guide vane cluster 10 according to the invention in the region of the radially inner platform 12 is shown from another viewing angle. It is recognized that the guide vane cluster 10 comprises three integral vanes 14, which are joined together by way of the common radially inner platform 12 as well as by way of a common radially outer platform 16 (see FIG. 3). The guide vane cluster 10, together with additional guide vane clusters (not shown), which can be designed identically or differently, is used for the manufacture of a guide vane ring (not shown) in an aircraft engine. Each vane 14 comprises a vane element 17 having a suction side 18 and a pressure side 20, the suction side 18 and the pressure side 20 each time being joined together by a leading edge 22 and a trailing edge 24. In order to achieve an improved vibration behavior, the three vanes 14 each have different trailing edge wall thicknesses in radial lengthwise extension regions corresponding to one another. In other words, different vane elements 17 have different trailing edge thicknesses in regions at specific radial positions referred to platform 12 or 16. Therefore, non-symmetric annular space contours are formed on the guide vane cluster 10, whereby the aerodynamic properties of guide vane cluster 10 also are influenced and improved in a targeted manner. Except for their trailing edges, vanes 14 are constructed identically in the present exemplary embodiment. Basically, only two of the three vanes 14 can also have different radial wall thickness courses of the trailing edges, whereas the third vane 14, in particular with respect to its radial wall thickness course of the trailing edge is designed identically to one of the two other vanes of guide vane cluster 10.

The different radial trailing edge wall thicknesses are achieved in the present exemplary embodiment by way of different rounding radii in connection regions 26 of vanes 14 on platform 12. Connection regions 26, which can also be designated a fillet or flute, are found in the region of the vanes in the vicinity of the platform and each has a radial lengthwise extension that, for example, amounts to approximately 3% of the radial lengthwise extension of the entire trailing edge 24 of vane 14 or of vane element 17. Based on the rounded form, connection regions 26 continually transform into the regions remote from the platform or into middle regions of the respective vanes 14 that have the minimum trailing edge wall thicknesses. In this case, it can be provided that the rounding radii are enlarged very differently, but are not reduced, in the connection regions 26, when compared with conventional rounding radii, in order to produce structural stiffenings. Alternatively or additionally, it is also possible to produce structural adaptations in other regions of the trailing edges 24, and, for example, to produce local thickened areas or recessed areas of individual regions of the respective trailing edge 24 in a region of individual vanes 14 that is remote from the platform or in a middle region.

Figure 3:
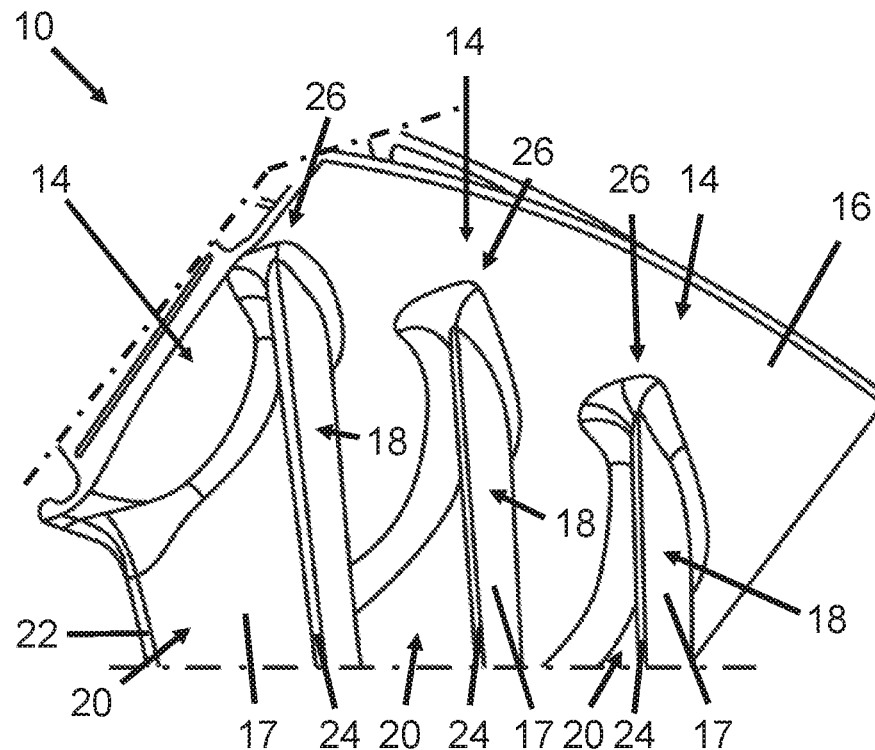
FIG. 3 shows a schematic perspective view of the guide vane cluster according to the invention in the region of a radially outer platform.
Figure 4:
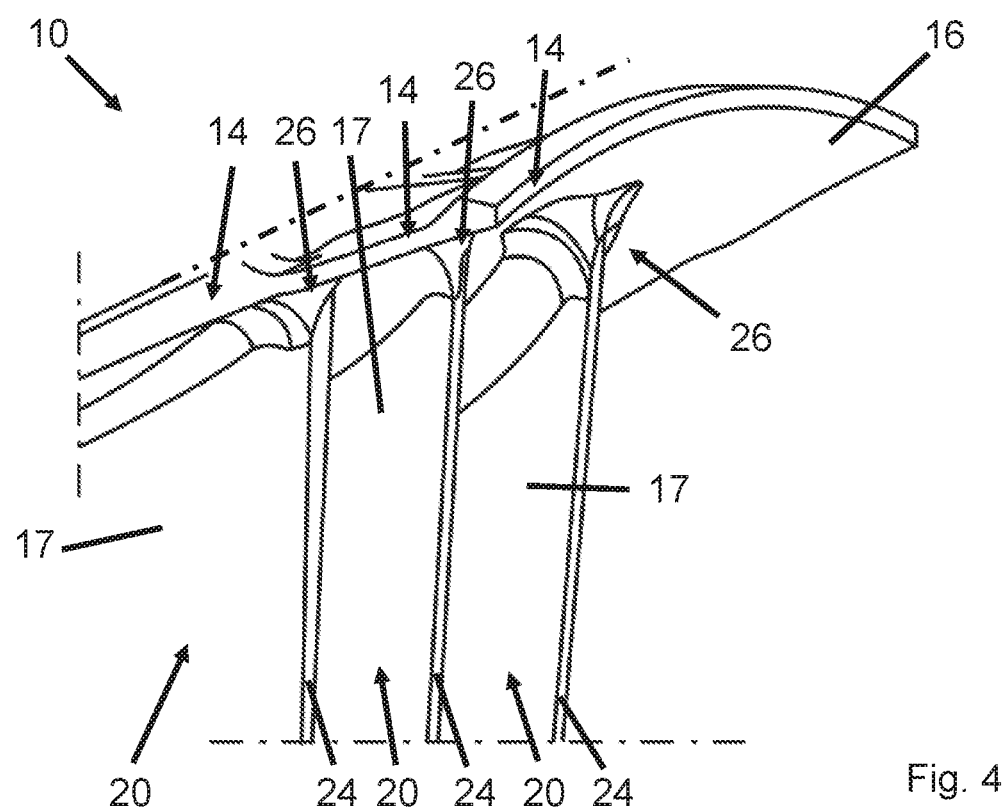
FIG. 4 shows another schematic perspective view of the guide vane cluster according to the invention in the region of the radially outer platform.

FIG. 3 shows a schematic perspective view of guide vane cluster 10 according to the invention in the region of radially outer platform 16 and will be explained together with FIG. 4, which shows another schematic perspective view of guide vane cluster 10 according to the invention in the region of radially outer platform 16 from another viewing angle. It is recognized that even on the radially outer end region of guide vane cluster 10, different radial trailing edge wall thicknesses will be achieved on radially outer platform 16 by way of different rounding radii in connection regions 26 of vanes 14. Connection regions 26 are found also in a region of the vanes in the vicinity of the platform and each have a radial lengthwise extension that amounts to approximately 3% of the radial lengthwise extension of the entire trailing edge 24 of vane 14 or of vane element 17. The region remote from the platform, lying between radially inner connection region 26 and radially outer connection region 26 of the vanes, correspondingly has a radial lengthwise extension that amounts to approximately 94% of the radial lengthwise extension of the entire trailing edge 24 of vane 14 or of vane element 17. According to the present exemplary embodiment, trailing edges 24 of vanes 14 in this region remote from the platform each have a constant trailing edge wall thickness.

Figure 5:
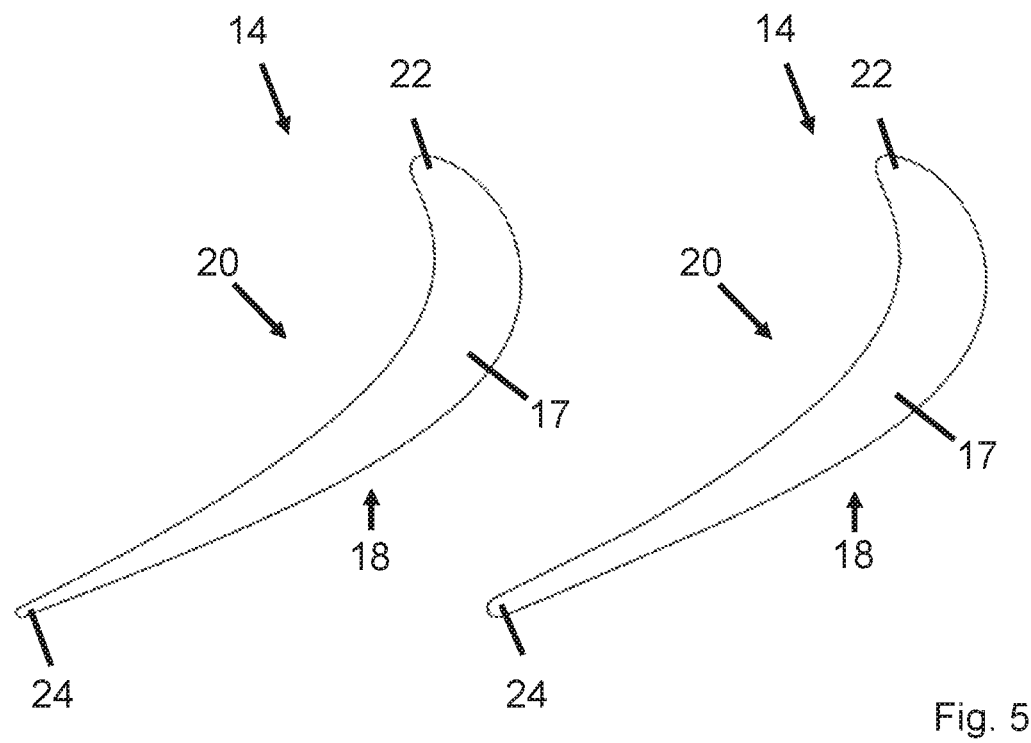
FIG. 5 shows two adjacent vanes of the guide vane cluster according to the invention in schematic cross-sectional view, wherein the vanes have different trailing edge radii with the same axial length.

According to another exemplary embodiment, FIG. 5 shows two vanes 14 of guide vane cluster 10 according to the invention in schematic cross-sectional view. It is recognized that vane 14 on the right, when compared to vane 14 on the left, has a thickened trailing edge 24 or a thickened trailing edge region but has the same axial length.

Figure 6:
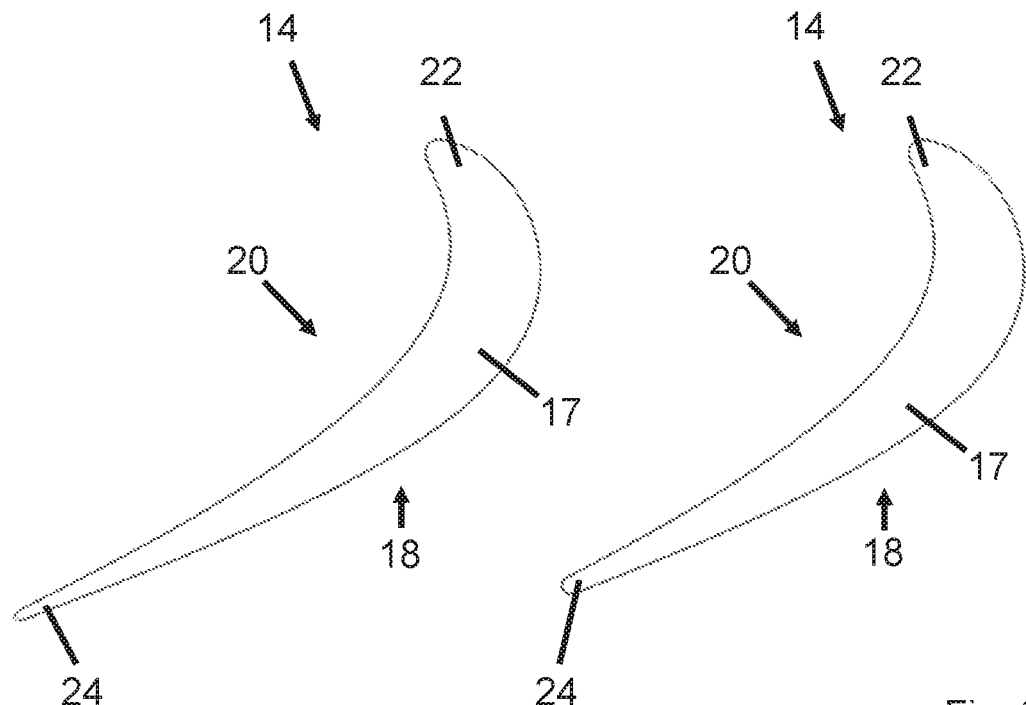
FIG. 6 shows two adjacent vanes of the guide vane cluster according to the invention in schematic cross-sectional view, wherein one of the vanes has an enlarged trailing edge radius when compared to the other vane, due to cutting back its vane profile.

According to another exemplary embodiment, FIG. 6* shows two adjacent vanes 14 of guide vane cluster 10 according to the invention in schematic cross-sectional view, wherein, unlike the preceding exemplary embodiment, vanes 14 do not have the same axial length. Instead, two vanes 14 that are first identically designed are provided, after which vane 14 on the right is cut back in the region of its trailing edge 24. Therefore, vane 14 on the right, when compared to vane 14 on the left, also has an enlarged trailing edge radius.

Figure 7:
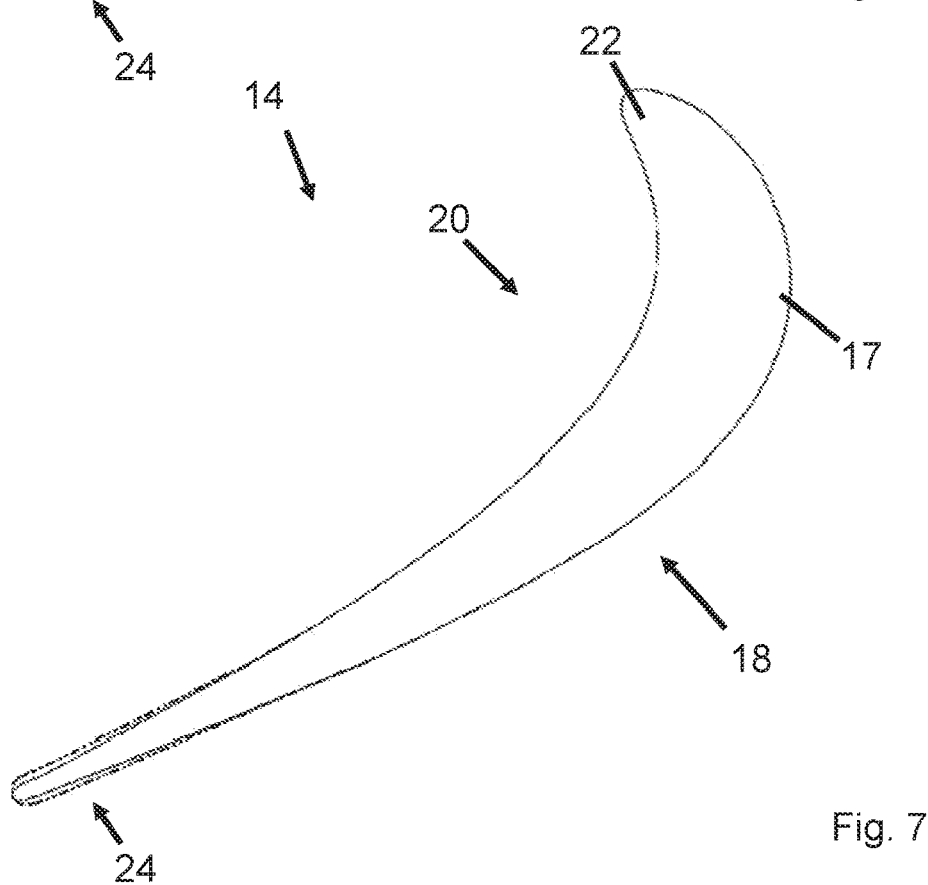
FIG. 7 shows an overlaying of two vane profiles having identical axial length and different trailing edge radii.

For clarification, FIG. 7* shows an overlaying of two vane profiles with identical axial lengths and different trailing edge radii. It is recognized that vanes 14, for which the vane 14 shown on the left in FIG. 5 is presently represented by a solid line, and the vane 14 shown on the right in FIG. 5 is represented as a dotted line, differ only in the region of their trailing edges 24, i.e., referred to their total axial lengths, only in a back length region of less than 30%. Otherwise, vanes 14 are identically designed.

Figure 8:
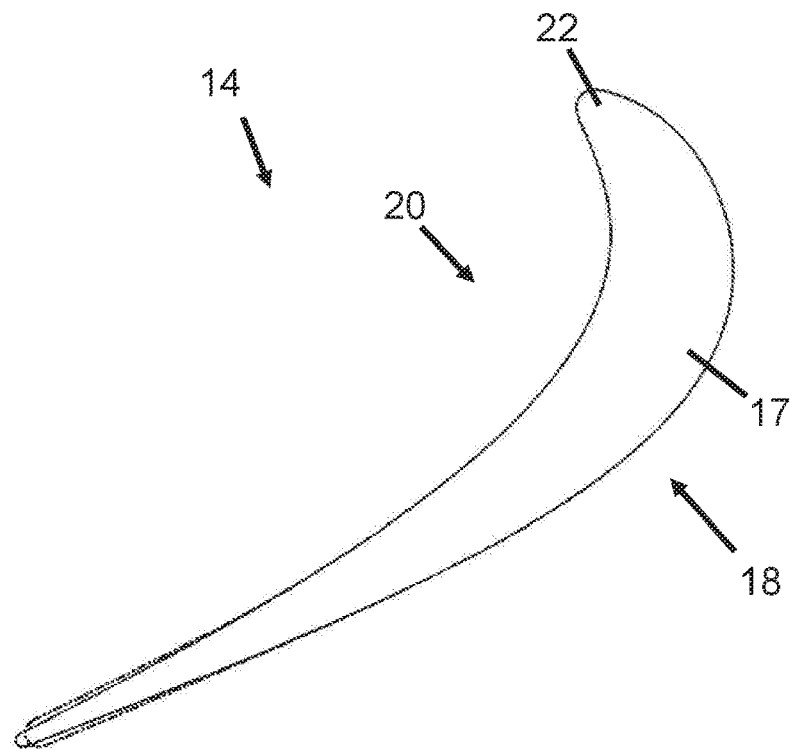
FIG. 8 shows an overlaying of two vane profiles having identical chord length and different trailing edge radii.

According to another exemplary embodiment, FIG. 8* shows an overlaying of two vane profiles having the same chord length but different trailing edge radii. It is recognized that vanes 14 also differ only in the region of their trailing edges 24 and are otherwise identically designed. Unlike the preceding exemplary embodiment, the vane 14 shown by the dotted line and the vane 14 shown by a solid line have different axial lengths.

What is claimed is:

1. A guide vane cluster for a turbomachine, having at least two vanes that are joined together by way of at least one common platform for the radial delimiting of a flow channel of the turbomachine, wherein each vane has a vane element with a suction side and a pressure side that are joined together by a leading edge and a trailing edge,
    wherein the at least two vanes have different trailing edge wall thicknesses at least in a corresponding radial lengthwise extension region,
    wherein the at least two vanes have the same cross sectional geometry, at a given axial height, with the exception of the trailing edge wall thickness, and
    wherein the at least two vanes are exposed to a common flow path at the same time.
2. The guide vane cluster according to claim 1,
    wherein the at least two vanes are joined together by way of a common radially inner platform and a common radially outer platform.

3. The guide vane cluster according to claim 1, wherein the at least two vanes have roundings with different rounding radii in corresponding connection regions to the at least one common platform.

4. The guide vane cluster according to claim 1, wherein the guide vane cluster comprises at least three vanes, wherein at least two of the vanes have different trailing edge wall thicknesses in a corresponding radial lengthwise extension region.

5. The guide vane cluster according to claim 1, wherein the at least two vanes have at least one region in a vicinity of the at least one common platform that extends away from the at least one common platform by at most 25% of the radial lengthwise extension of the trailing edge, and/or have at least one region remote from the at least one common platform that extends by at least 25% of the radial lengthwise extension of the trailing edge in a central region of the trailing edge.

6. The guide vane cluster according to claim 5, wherein at least one of the at least two vanes has a maximum trailing edge wall thickness in a region in the vicinity of the at least one common platform and/or in a region remote from the at least one common platform.

7. The guide vane cluster according to claim 1, wherein a maximum and/or a minimum trailing edge wall thickness of at least one vane of the at least two vanes is constant, along a predetermined radial lengthwise extension region.

8. The guide vane cluster according to claim 1, wherein at least one vane of the at least two vanes has a radial transition region between a maximum and a minimum trailing edge wall thickness.

9. The guide vane cluster according to claim 8,
wherein the trailing edge wall thickness in the transition region of the at least one vane increases continually and/or monotonically from the minimum to the maximum trailing edge wall thickness, and/or that the transition region extends over at most 25% of the radial lengthwise extension of the trailing edge.

10. The guide vane cluster according to claim 1, wherein the at least two vanes each have an axial length and a chord length, wherein the at least two vanes have the same axial length and/or the same chord length or that at least one vane, when compared to at least one other vane, has a cut-back profile in the region of its trailing edge.

11. The guide vane cluster according to claim 1, wherein the guide vane cluster is configured and arranged into a guide vane ring for a turbomachine.

12. The guide vane cluster according to claim 11, wherein the guide vane ring is configured and arranged into a turbojet engine.

* * * * *